United States Patent [19]

Coulter et al.

[11] Patent Number: 5,201,048

[45] Date of Patent: Apr. 6, 1993

[54] HIGH SPEED COMPUTER SYSTEM FOR SEARCH AND RETRIEVAL OF DATA WITHIN TEXT AND RECORD ORIENTED FILES

[75] Inventors: Erick S. Coulter; Thomas A. Richards, both of Littleton, Colo.

[73] Assignee: Axxess Technologies, Inc., Littleton, Colo.

[21] Appl. No.: 750,745

[22] Filed: Aug. 21, 1991

Related U.S. Application Data

[63] Continuation of Ser. No. 278,978, Dec. 1, 1988, abandoned.

[51] Int. Cl.[5] .............................................. G06F 15/40
[52] U.S. Cl. ................................ 395/600; 364/DIG. 1; 364/282.1; 364/282.2; 364/283.2; 364/282.4
[58] Field of Search .............................. 395/600, 700

[56] References Cited

U.S. PATENT DOCUMENTS

| | | | |
|---|---|---|---|
| 4,186,438 | 1/1980 | Benson et al. | 395/600 |
| 4,205,371 | 5/1980 | Feather | 395/600 |
| 4,384,325 | 5/1983 | Slechta, Jr. et al. | 364/200 |
| 4,422,158 | 12/1983 | Galie | 364/900 |
| 4,468,732 | 8/1984 | Rauer | 395/600 |
| 4,495,566 | 1/1985 | Dickinson et al. | 364/200 |
| 4,497,039 | 1/1985 | Kitakami et al. | 395/600 |
| 4,504,907 | 3/1985 | Manning et al. | 364/200 |
| 4,604,686 | 8/1986 | Reiter et al. | 364/200 |
| 4,604,710 | 8/1986 | Amezcua et al. | 364/600 |
| 4,611,298 | 9/1986 | Schuldt | 364/900 |
| 4,803,614 | 2/1989 | Banba et al. | 364/200 |
| 5,142,674 | 8/1992 | Barker et al. | 395/600 |

OTHER PUBLICATIONS

*APS Text Search and Retrieval Reference Manual*, Planning Research Corporation, Sep. 1986.

*Primary Examiner*—Kevin A. Kriess
*Attorney, Agent, or Firm*—James R. Young

[57] ABSTRACT

Disclosed is a system which provides for the high-speed search and retrieval of both text and record-oriented information from one or more files stored in a computer or computer network. The system first creates a search file with a structure that can be quickly searched for each reference or boolean combination of references using, as input, either the full data to be matched or only partial data and "wildcard" symbols. This search file can be placed on a computer different from the original data files, to facilitate searching in a network environment.

21 Claims, 15 Drawing Sheets

HIGH SPEED COMPUTER SYSTEM FOR SEARCH AND RETRIEVAL OF DATA WITHIN TEXT AND RECORD ORIENTED FILES

This application is a continuation of application Ser. No. 07/278,978, filed Dec. 1, 1988 now abandoned.

BACKGROUND OF THE INVENTION

This invention relates to data processing systems and more particularly to a system and method which provides for the high-speed search and retrieval of data stored in computer files. The system combines the ability to search text oriented data with the ability to also access data which is stored in record oriented files. In addition, the searching of these two types of files can be done simultaneously.

Using modern technologies, there are now numerous methods for creating computerized, text-oriented document files as well as field-oriented record files. Text files are routinely being originally created or transcribed from paper documents using text processing and desktop publishing systems. This trend has been accelerated by the introduction of scanning systems which can "read" printed texts and automatically translate them into computer files. The number of record files continues to grow in number due to the increasing use of such tools as the off-the-shelf Data Base Management System (DBMS).

With all of this data now in computer files, the problem is now how to quickly access this data and find specific information stored in these files. For text-oriented data files there have been two main methods used. The first method entails the use of real-time pattern matching methods. This means that, at the time the search request is made, a character-by-character search is made through each file for a pattern which matches the search parameters. While this method can be used on small files on small computers or larger files on very fast mainframe computers, it is not very practical for medium or large files on small computers or very large (gigabyte) files on mainframes. The problem is that even simple, single term searches can consume a great deal of computer time resulting in a slow response to the user. The other approach to the retrieval problem with text files is to employ a DBMS to create a database of the files which can be quickly referenced in a manner similar to the way in which DBMS's handle field oriented records. Unfortunately, although this methodology can be relatively fast, it is also expensive in the use of data storage and difficult to use. The DBMS' database file size is usually greater in size (typically 1.25-2 times greater) than the combined size of the original text files. In addition, these DBMS' also consist of thousands of lines of code to administer the complex data files they create. Small computers are strained to support the size of these files and the added size of the DBMS programs necessary to administer them. Also, DBMS' often require the mastery of Query Languages which are specialized to the retrieval of record-oriented data rather than the more simply organized text documents.

For accessing record-oriented files, DBMS' have been the traditional solutions. Again, although they are fast, there are several drawbacks to their use. First, the issue of size of DBMS programs is the same as discussed earlier. DBMS' require a significant overhead because of their size and data storage organization even if the file to be accessed is relatively simple in its organization. Secondly, record-oriented DBMS programs usually cannot handle searches of both text-oriented and record-oriented files with the same query; they normally require the use of multiple queries, leaving the user to manually combine the output. Finally, DBMS programs can normally find and retrieve records in a query only if the entire field content is specified as the parameter for the search. This makes it difficult to do effective searches on files which have fields that are text-oriented documents, however short. A search based on a partial field description such as a few words buried somewhere within such a "text field" cannot normally be accommodated by a DBMS with high-speed response.

With the above described problems evident when using existing methods for searching for data in: 1) text-oriented files; 2) text-oriented files and record-oriented files at the same time; and 3) record-oriented files with free text fields, it is thus apparent that there is a need in the art for an improved search system that allows high speed searching of large files of these types using small computers or small amounts of computing resources.

SUMMARY OF THE INVENTION

It is an object of the present invention to provide a high speed computer search of text files.

It is another object of the present invention to provide for high speed search of record oriented files.

Still another object of this invention is to provide for high speed search of both text oriented and record oriented files simultaneously, in the same search request.

Yet another object of the instant invention is to build a separate search file from the original text and record oriented files to facilitate the search.

Another object of the invention is to allow the search of the files to be performed on one computer while the original files are stored on a second computer.

These and other objects of the present invention are accomplished with a system that operates in two phases. In phase 1, a scan is made through all of the text or each of the records in the specified source data files. The names of these files can be either explicitly specified by a startup string for the system or their names can be in a secondary file whose name is specified in the startup. Prior to this scan, the organization of the file (text/record) has been specified as well as other characteristics (field length, end-of-page character, etc.) through a set of configurable parameters. The system processes each source data file by, in turn:

1) opening each source file (with read-only permission access);
2) reading the file word-by-word or record-by-record;
3) cataloging each occurrence of each unique character string, word or field content in the file;

In addition to the source data files, the system will process one or more exclusion information file(s) to be used to modify the process. These exclusion files, if specified, each contain a list of words or field values which are not to be cataloged because they will not be used in a search. Use of these lists minimize the size of the search file. During this process, several intermediate work files are used to minimize the need for RAM memory. Phase 1 ends when all of the source data files have been processed. In phase 2, if the system is being run for the first time, the system creates a single search file as output from the data stored in the work files. This search file contains (optionally compressed) information including: 1) the name of each file cataloged; 2) the format of each file; 3) each unique character string, word or field value; and 4) a pointer to every occurrence of that string/word/field in each file. If the system is being run as an update to an existing search file, the system modifies the search file to reflect changes in the source data files which have been made since the last update/creation, based on the work file information. At the end of phase 2 the work files can be deleted if the system ends without error.

After the search file is created, it can be transferred to a second computer system, if desired. Optionally, the search file can be created on a second computer if network access to the original source data files is available. Using the search file, the system can be requested to do searches. When started, this search phase first opens the search file (with read-only access) if necessary. When given the search parameters, which can be combined into boolean relationships using AND, OR, NOT, etc., the system can quickly find entries in the search file which point to all reference pages in the source data files that contain information with a pattern that matches the search parameters. The user is then provided with the number of occurrences and/or reference page locations of the search parameters. If desired, the user can then view each of the matching occurrences. At the time of any request to view an occurrence, the system opens the source data file (with read-only access), if necessary, and indexes into the file to read and display the requested occurrence. The system finds the file and specific occurrences via file name and index pointers stored in the search file. If desired, the text of all reference pages which are found can be written out into an output data file for later viewing or post-processing. Because the search file contains specific location information on each source data file, the system can easily access these on a second computer system in a network. That is, the search file can be located on one (or more) computer systems, while the original source data files are located on another computer system.

In addition to search terms, the user can define and store in a "thesaurus", terms which are synonymous, for search purposes, with a given term, or the user can store, in a "macro library", multiple search terms which can be invoked with a single name. If a priority is defined for each search term, matching reference pages are presented in order of priority.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

Figure 1:
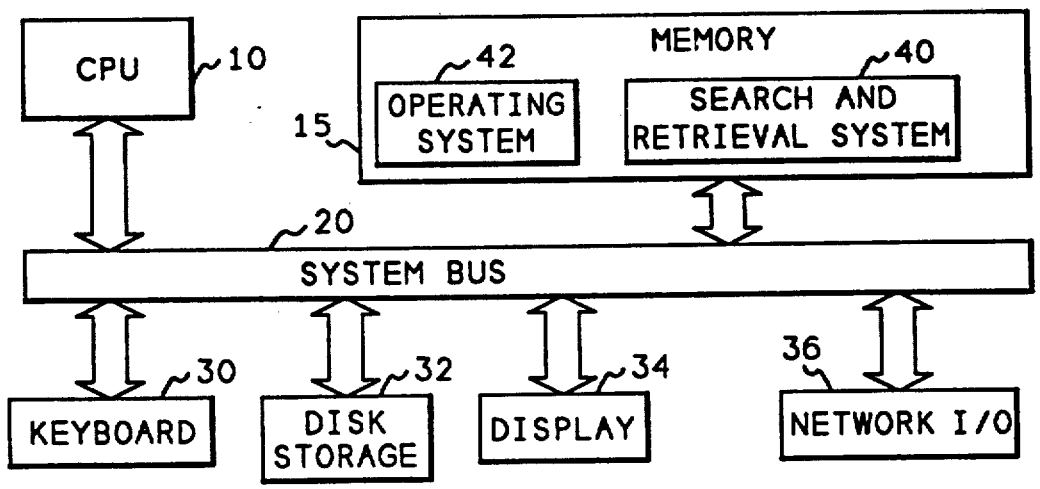
FIG. 1 shows a block diagram of a computer system suitable for running the high speed search and retrieval system of the present invention.

The following description is of the best presently contemplated mode of carrying out the present invention. This description is not to be taken in a limiting sense but is made merely for the purpose of describing the general principles of the invention. The scope of the invention should be determined with reference to the appended claims.

In general, the invention performs a search of a combination of text oriented files, such as letters, memos, articles, etc., and record oriented files, such as databases, etc., by building an intermediate search file from the original documents, and then searching this intermediate search file. When occurrences of the search terms satisfying the boolean relationships specified by the user are found in this intermediate search file, a count of the occurrences, as well as a list of the source data files and location within those files (reference pages) in which the search terms are satisfied, can be provided directly from the search file without access to the source data files. In addition, the search file contains sufficient information to allow the search software to access the original source data file and retrieve the actual text that matches the occurrences of the search terms. By building the search file, the original source data files are only accessed to fetch the exact reference pages desired where the search terms were found, and each original source data file is not reprocessed with each search. Also, the search file, being smaller than the original files and being more efficiently organized, can be searched more quickly than searching the original data files and it can be used on computers which could not contain the original data files because of size or speed restrictions.

Initially, a scan is made through all of the text or each of the records and fields in the specified source data files. Prior to this scan, the names of the files to be scanned, and the organization of each file (text/record)

has been specified as well as other characteristics (field length, end-of-page character, etc.) through a set of configurable parameters. The system processes each data file by reading the file word-by-word or record-by-record and cataloging each occurrence of each unique character string, word or field content in the file. While the scan is being performed, the system will not catalog items which were specified in an exclusion file that contains a list of character strings, words, or field contents the user of the system will not search, in order to minimize the size of the search file. The contents of this file can easily be changed by the user. When all of the source data files have been processed, the software creates a single search file as output from the data cataloged during the scan. This search file, which may be in a compressed format, contains information such as the name of each file cataloged, the format of each file, each unique character string, word or field value in each file, and a pointer to every occurrence of that word/field in each file.

After the search file is created, it can be transferred to a second computer system, if desired. Using the search file, the user can request searches by entering search terms separated by the boolean parameters AND, OR, or NOT. When given the search parameters the software accesses the search file by pattern matching to find all occurrences of the search terms. The user is then provided with the statistics relating to the search parameters' occurrences. If desired, the user can then view each of the matching occurrences. To provide this view of an occurrence, the system accesses the source data file and indexes into the file to read and display the requested reference page. The system finds the file and specific reference page via file name and index pointers stored in the search file. If desired, the text of all reference pages which are found can be written out into an output data file for later viewing or post-processing. Because only one source data file is accessed at a time, the system can easily access these source data files on a second computer system in a network; that is, the search file can be located on one (or more) computer systems, while the original source data files are located on another computer system.

Referring now to FIG. 1, a computer system in which the present system runs is shown. A Central Processing Unit (CPU) 10 is attached to a system bus 20 which is used as a communications path between all the components of the computer system, including the CPU 10. Also attached to the system bus 20 is a keyboard 30 which is used to input search terms to the search and retrieval system; a disk storage 32 which is used to contain the original source data files to be searched, as well as the search file; a display 34 for the system to use in supplying results to the user of the system; and network I/O 36, which might consist of a serial interface or a Local Area Network interface, which is used by the system when it works in a network. The search and retrieval system 40 is located in memory 15 and uses an operating system 42 to assist it in performing its function.

Figure 2:
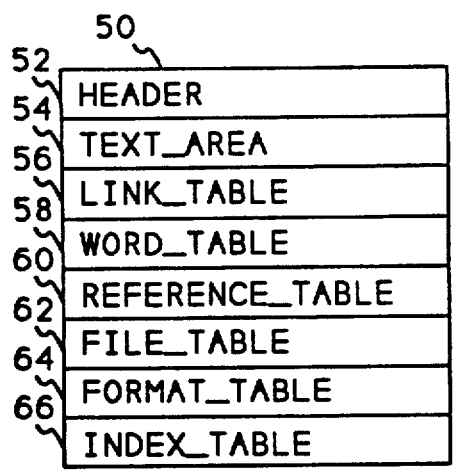
FIG. 2 shows a schematic representation of the file structure of the search file.

FIG. 2 is a table showing the components of the search file 50 of the present invention. The search file 50 contains a header 52, a text_area 54, a link_table 56, a word_table 58, a reference_table 60, a file_table 62, a format_table 64, and an index_table 66. Each of these components will be discussed in detail below. While the table of FIG. 2 shows the components arranged in a particular order, no such order is required for operation of the invention. The only order required is that the header 52 of the search file 50 must be in a known location within the file 50. It is also possible for the header 52 to be eliminated in certain specific implementations of the search and retrieval system.

Figure 3:
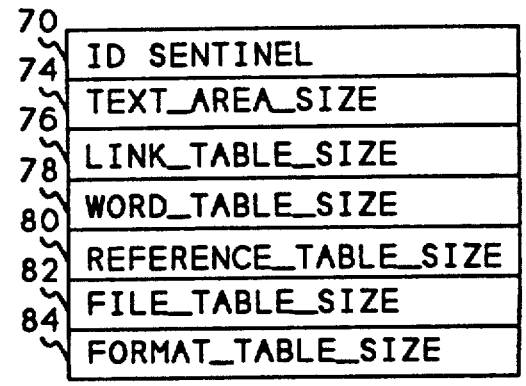
FIG. 3 shows a schematic representation of the file header of the search file.

FIG. 3 shows a detail breakdown of the header component 52 of the search file 50. An ID Sentinel 70 is a string of characters used by the search and retrieval software to identify that this file is a search file built by it. The specific characters used are not significant so long as they would not normally be found in other files that a user might mistakenly identify as a search file. The text_area_size 74 defines the number of bytes in the text_area 54 of the search file 50; the link_table_size 76 defines the number of bytes in the link_table 56; the word_table_size 78 defines the number of bytes in the word_table 58; the reference_table_size 80 defines the number of bytes in the reference_table 60; the file_table_size 82 defines the number of bytes in the file_table 62; and the format_table_size 84 defines the number of bytes in the format_table 64. In the preferred embodiment, the index_table is a fixed size and does not require a length specification in the file header. Other methods of building an index could be used that would require that the length of the index_table be specified in the header.

Figure 4:
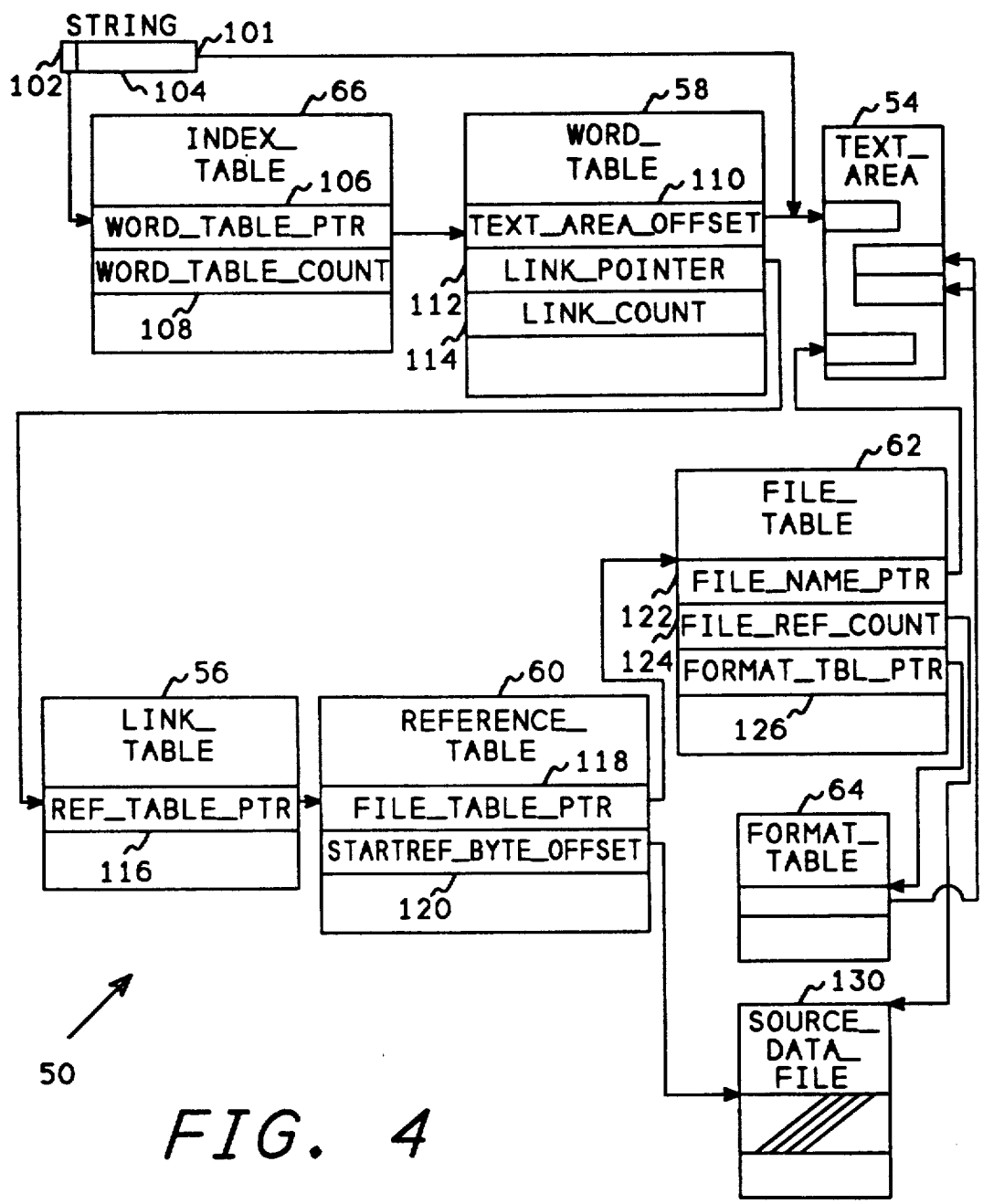
FIG. 4 shows the relationship of the tables contained in the search file.

Referring now to FIG. 4, the relationship of the components of the search file 50 is shown. To better illustrate how the components of the search file 50 relate to each other, an example will be followed using a search for a search term 101 having a first part 102 and a trailing part 104. The search term 101 is not part of the search file 50, but is only used to explain the relationships of the components. A first part 102 of the search term 101 is used as an index into the index_table 66. This first part may be of any length, including the entire search term, but in the preferred embodiment, it is comprised of the first character of the search term. A word_table_pointer 106 points to the first word in the word_table 58 that starts with the first part 102 of the search term 101. A word_table_count field 108 contains the number of words in the word_table 58 that start with the first part 102 of the search term. The word_table_count 58 is used in searching to determine when all the possible words in the word_table 58 have been examined in order to determine that a search term cannot be found and it is used to aid in using binary search techniques.

Although an index_table is used in the preferred embodiment, no index is necessary since the word_table 58 is kept in sequence. Also in the preferred embodiment, when using the "wildcard" search feature, the index_table is not accessed if the first character is a wildcard. Instead, the software starts from the beginning of the word_table for each search, since the first letter of a wildcard search is not defined.

The word_table 58 contains a series of entries, one for each unique character string, word or field content in all the files being searched. Each entry is comprised of a text_area_offset 110 which points to the area of the text_area 54 that contains the original characters of the word. The actual characters of the word are not kept in the word_table 58 in the preferred embodiment so that this table can have entries that are of a fixed length, which facilitates and speeds up the search. The text_area 54 contains all the characters of all the unique words found in the original files, as well as other miscellaneous character strings such as file names. In the preferred embodiment of the invention, these characters are stored as character strings terminated with a null byte, however, any suitable method of storing character strings and their length may be used. Also, the text_area 54 can be sorted into sequence to improve efficiency.

In order to make the comparison of the search term 101 to the word pointed to by the text_area_offset 110, the trailing part 104 of the search term 101 must also be used. If the search term 101 and the word pointed to by the text_area_offset 110 match, then the rest of the word_table entry 58 is used. The link pointer 112 points to the first reference in the link_table 56, and the link count 114 is a count of all the references in the link_table 56 where this word was found in the original files. The link_table 56 contains one entry for each occurrence of each unique character string, word, or field on each reference page in each original file. This entry, ref_table_ptr 116, is a pointer into the reference_table 60.

The reference_table 60 contains a series of entries, one for each reference page of each original file. A reference page is a division of the original file into smaller, more manageable, areas. For a text file, a reference page can be defined by the user and is usually a page of text, or a specified number of lines, or any other division the user wishes to use. For example, a reference page could be a line, paragraph, sentence, page, or the entire text file. For a record oriented file, a reference page is usually a record. Each entry of the reference_table 60 contains a file_table_ptr 118 into the file_table 62 which identifies the file where the reference page was found, and a startref_byte_offset 120 which identifies the relative byte offset of the first byte of the reference page in that file. Using the entries in the reference_table 60, the software can find each reference page in each original file.

The file_table 62 has a pointer, the file name pointer 122, to the name of the file; a count, file_ref_count 124, of the number of reference pages in the file; and the format_table_ptr 126 which points into the format_table 64 to identify the characteristics of the original file.

The source data file 130 on FIG. 4 represents one of the original files to be searched.

To summarize FIG. 4, the first character of a search term is used to access the index_table 66, which is used to identify the first word in the word_table 58 which starts with the letter. The word_table 58 points to the full character string in the text_area 54 and when a match is found, the word_table entry is also used to access the link_table 56, and to identify the number of reference pages on which this word was found. The link_table 56 identifies all the places in the original source data files where this word was found, and points to the reference_table 60 which allows the software to find the full text of each reference page of each file containing the word.

Figure 5:
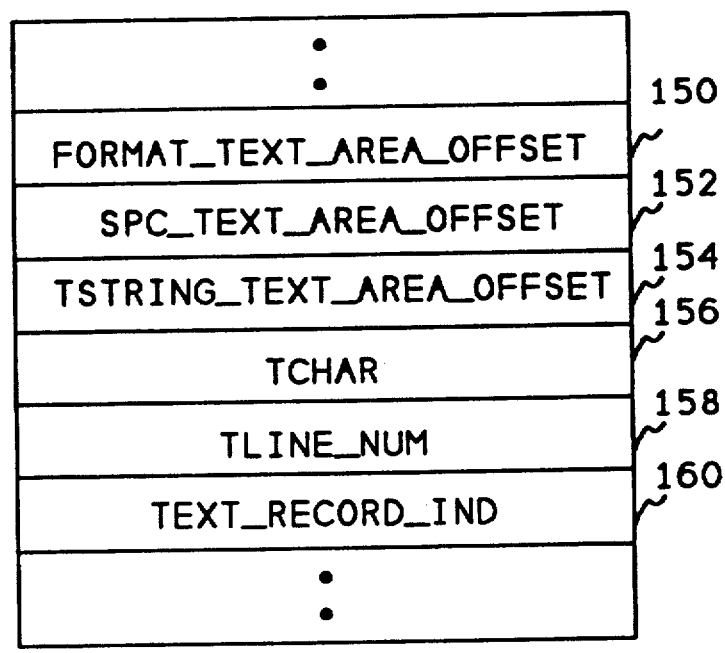
FIG. 5 shows a schematic representation of the format table of the search file.

Referring now to FIG. 5, a more detailed breakdown of each format_table 64 entry is shown. The format text_area_offset 150 is a pointer into the text_area 54 that contains the name of the entry in the format_table 64. Each entry of the format_table 64 has a name so that a user of the system having multiple files with identical characteristics can easily use the same format_table entry for each. One of the unique aspects of this invention is the ability to include or exclude special characters in words. The standard alphabetic characters A-Z and a-z, as well as the numbers 0-9 are always considered part of a word. The other characters of the particular code set being used may be included as part of a word by specifying them to the software. Also, the characters specified can be identified separately for each file. If this feature is used, the spc_text_area_offset 152 is a pointer into the text_area 54 of a string of special characters which are to be included as part of words.

Another unique aspect of this invention is the ability to identify how a reference page is to be defined in each file. That is, a reference page may be defined as a certain number of lines, ended by a certain end-of-page character, such as a form feed character, or ended by a certain string constant, such as "Page". These definitions can be different for each original source data file. The tstring_text_area_offset 154 is a pointer into the text_area 54 that contains the string constant used to identify the end of a reference page in the original file. Tchar 156 is used to hold the end-of-page character, and tline_num 158 identifies the number of lines per page. The text_record_ind 160 identifies whether the pages of the original file are comprised of lines of text or records.

Figure 6:
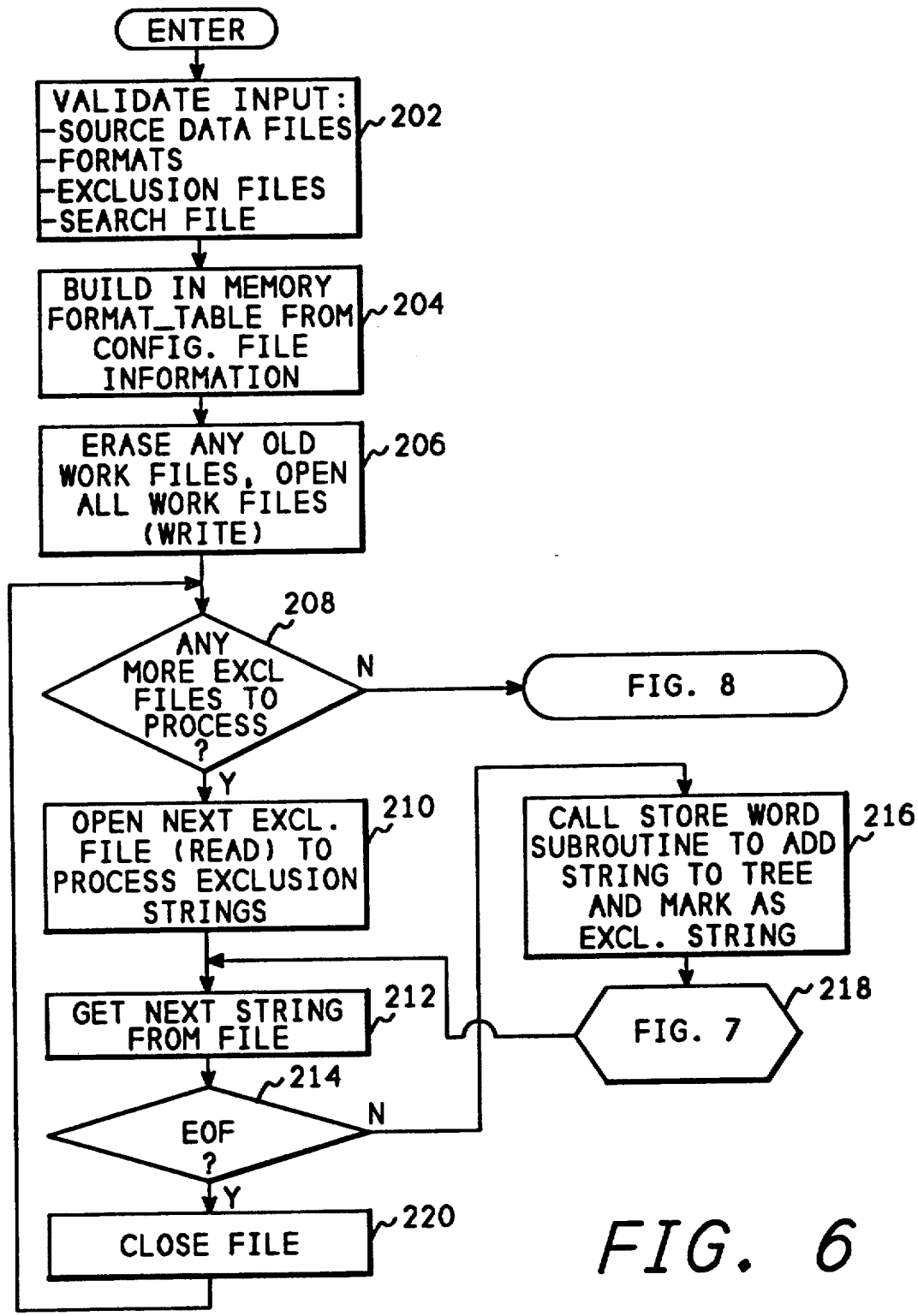
FIG. 6 is a flowchart depicting the initialization of phase 1 of the build search file process.

FIGS. 6 through 14 describe the process of building the search file, including the internal data structures used during the build process. Referring now to FIG. 6, The process of building the search file starts at block 202, which receives control from the operating system when the user starts the build program. Block 202 validates the names of the input files passed as a parameter by the user including the source data files and their formats, the exclusion files, and the name of the search file. Control then transfers to block 204 which builds the format_table from the configuration file information. The configuration file is a file created by the user that contains information about the structure of source data files. The contents of the format table was described in FIG. 5. Block 206 deletes any old work files remaining on the disk and opens a new set of work files. Up to eight work files are used by the preferred embodiment of the system, and all are opened at this point. Block 208 decides if any exclusion files, or any more exclusion files, need to be processed. Exclusion files contain words, strings of characters, specific fields, or specific field values that are not to be considered as searchable by the system, and consequently, these items will be specially marked during the build process. Although no exclusion files are required, words such as "and", "or", "the", etc. would normally be included by a user, as would fields or field values that will not be searched. If exclusion files remain to be processed, block 210 will open the next exclusion file and block 212 will read the next string from that file. If a string is available, block 214 will transfer to block 216 which will store the string into the word_tree by calling the store string subroutine in block 218. The store string subroutine is described in FIG. 7. After return from the store string subroutine, control transfers to block 212 to get the next string until all strings have been processed, then control transfers to block 220 where this exclusion file is closed. Control then transfers back to block 208 to look for another exclusion file. If all exclusion files have been processed, control transfers to FIG. 8.

Figure 7:
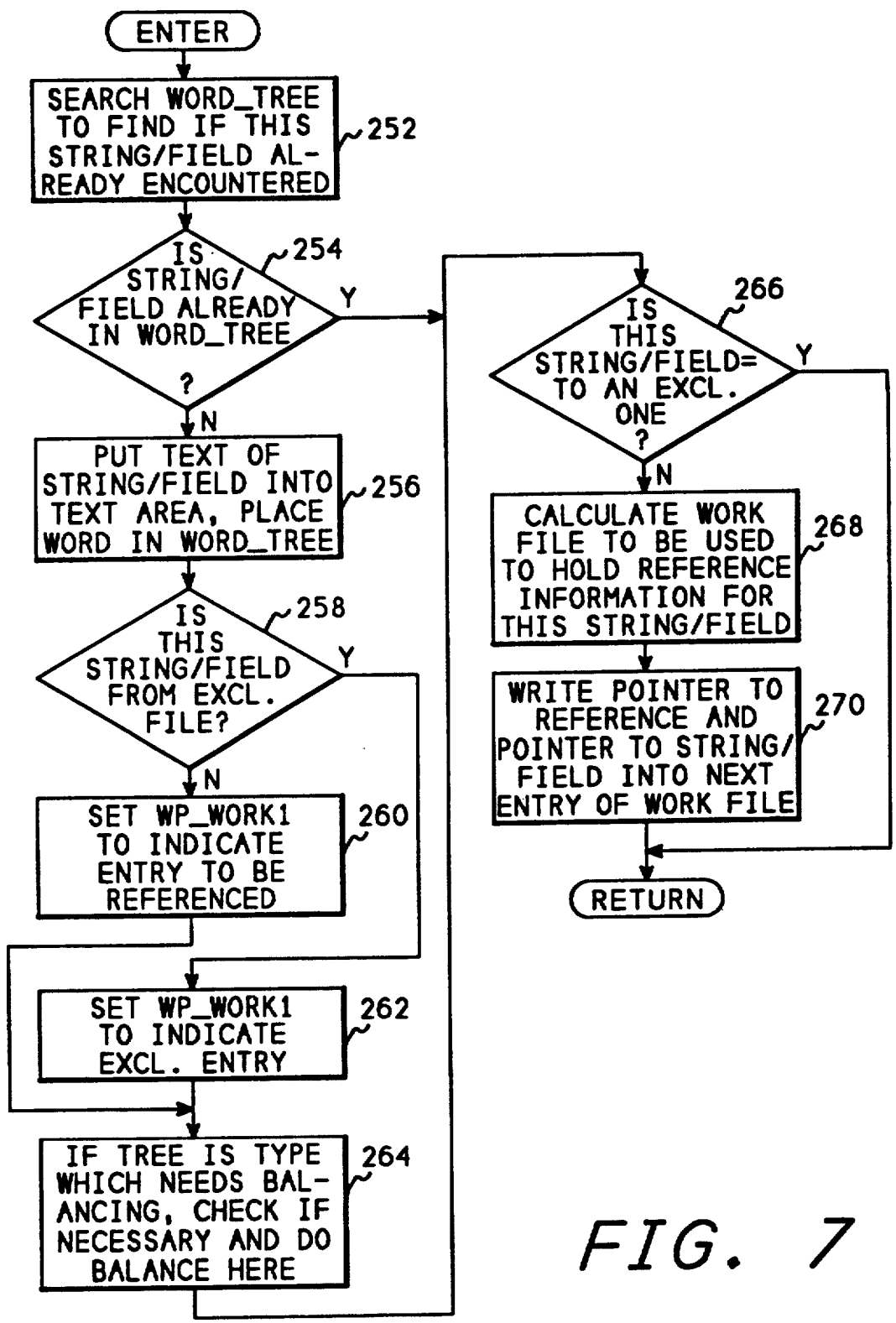
FIG. 7 is a flowchart depicting the store word function of phase 1 of the build search file process.
Figure 12:
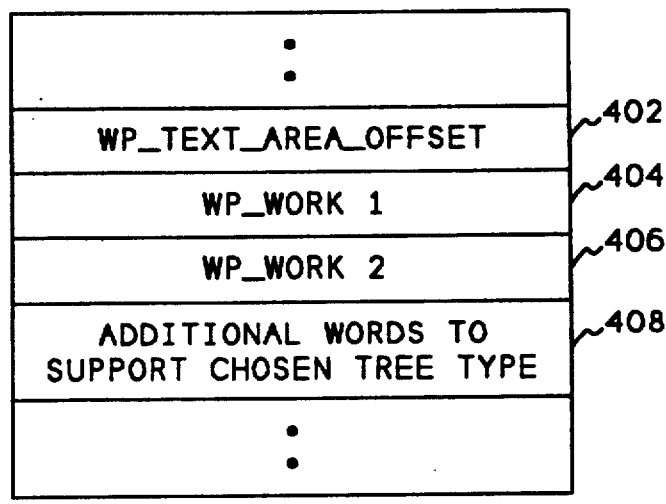
FIG. 12 is a schematic representation of the word tree work area used in the build search file process.

To store the list of unique words or strings found in the source data files, a tree structure is used, for speed considerations, to keep the strings in order during the build process. In the preferred embodiment, a balanced binary tree is used. FIG. 12 shows the structure of each node of the tree, and this figure will be described along with FIG. 7, which describes the store string subroutine that builds the tree. Referring now to FIG. 7, the store string subroutine is shown. Block 252 receives control when the subroutine is called, and it searches the tree to determine if this string or field has already been encountered. If the string has not been encountered, block 254 transfers control to block 256 which stores the text of the string or field into the text_area (Reference 54 on FIG. 4), and stores a pointer to the string into a new node of the tree, at wp_text_area_offset 402 shown in FIG. 12. Block 256 then places this tree node into the tree at its proper location. When store string was called, it was passed a parameter indicating whether or not this string was from an exclusion file. Block 258 tests this parameter and if the string was from an exclusion file, block 262 sets the wp_work1 area 404 (FIG. 12) to indicate an exclusion entry. By writing exclusion entries to the search file, the user can differentiate excluded terms from terms not in the original files. If the string is not an exclusion entry, control in transferred to block 260 to set the wp_work1 area 404 to indicate the string will be referenced, that is, it will be searchable. After wp_work1 404 is set properly, control transfers to block 264 to balance the tree if necessary. This invention can use any number of tree types to store the strings, and some types need to be balanced, after adding nodes, to maintain efficiency. Different types of tree structures are well documented in the art, as are the methods of balancing such trees. Depending on the tree type, additional information may need to be stored in the tree. This information is depicted by reference 408 on FIG. 12. After balancing the tree, block 266 again tests to see if the string is an exclusion string and if so, the subroutine returns to its caller. If the string is not an exclusion string, block 268 calculates the work file to be used to hold the reference from the source data file. Multiple work files are used to facilitate phase two of the build process. The number of work files can be selected by the user, and the work file to be used is the index of the word_tree node used to store the string, module the number of work files. The index of the tree node is a function of the memory location of the node, not its sorted order, so the work file will always be the same for a particular word. By the way these files are built, all entries for a character string, word, or field will be in the same work file and the entries in each work file will be in ascending reference page order. After determining the work file, block 270 writes this entry to the work file, and then returns to the caller.

Figures 13, 14:
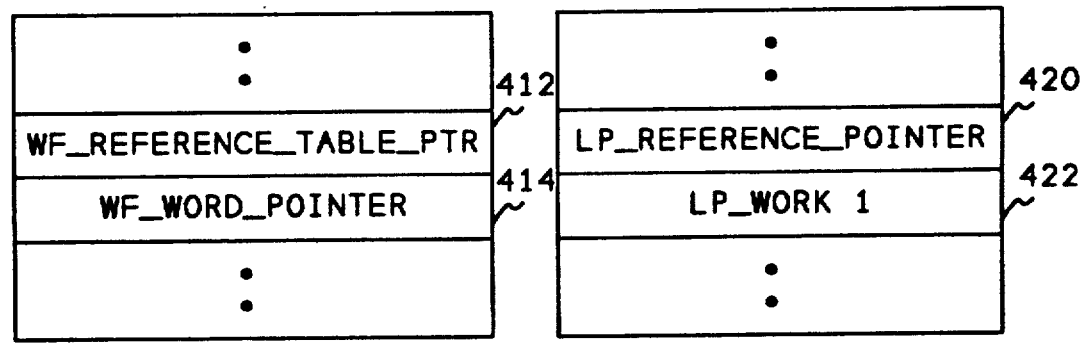
FIG. 13 is a schematic representation of a work file used in the build search file process.
FIG. 14 is a schematic representation of the link pre_table work area used in the build search file process.

FIG. 13 depicts the structure of each entry in the work files. For each reference to each unique string, except exclusion strings, wf_reference_table_ptr 412 contains a pointer to the reference table entry (FIG. 4) that points to the reference page and file where the unique string was found. Wf_word_pointer 414 points to the tree node for the string.

Figure 8:
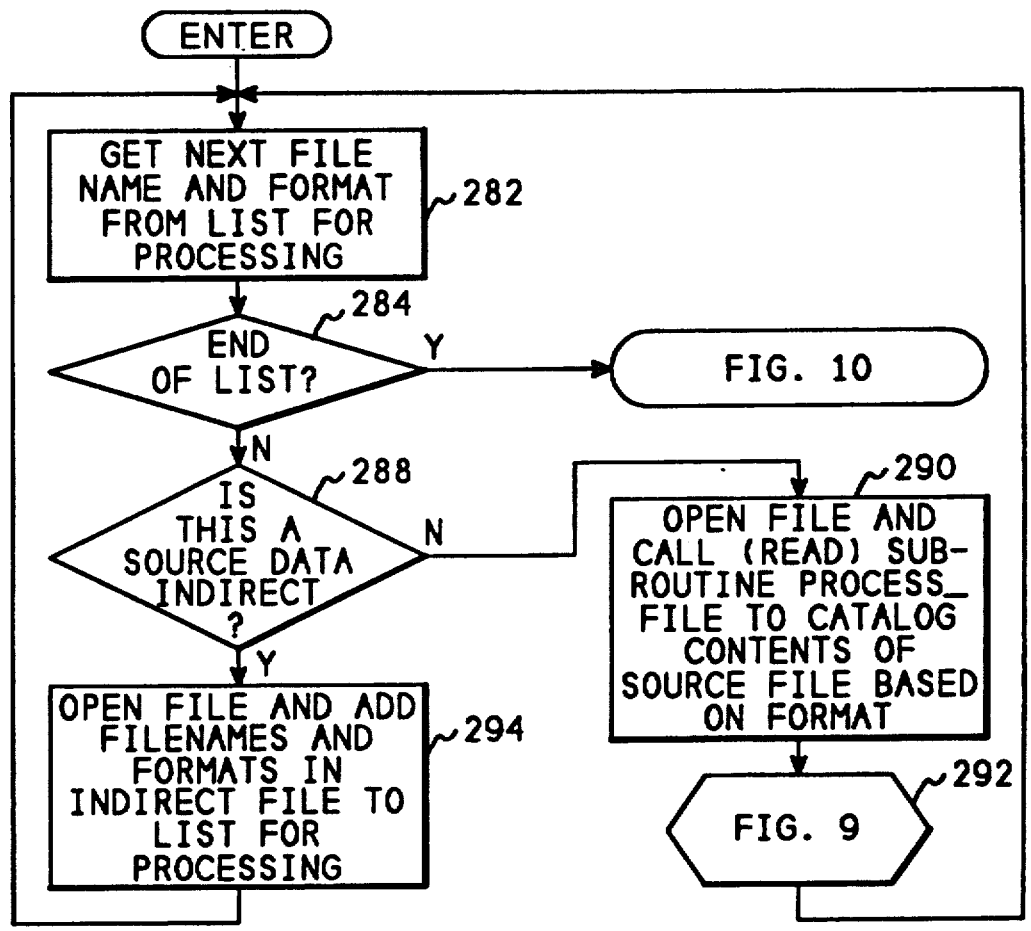
FIG. 8 is a flowchart showing the processing of indirect file lists in phase 1 of the build search file process.

After all exclusion files were processed in FIG. 6, control was transferred to FIG. 8 to start processing the source data files.

FIG. 8 is a flowchart showing the processing of the list of source data file names. When control is transferred to FIG. 8, block 282 gets the next source data file name from the list passed as a parameter from the user when the build program was called. If there are no more source data files to be processed, block 284 transfers control to FIG. 10. Otherwise, block 288 determines if the file name is a source data indirect file. A source data indirect file is a means to allow the user to easily specify several source data files. The source data indirect file is simply a file that contains the names of the source data files and their format names, and in the preferred embodiment, is indicated by the user placing an asterisk before the file name in the parameters passed when the build program is called. If the file specified is a source data indirect file, the file is opened by block 294, its contents are added to the list of source data filenames, and control transfers to block 282 to process each of these files. If the file is a source data file, block 288 transfers to block 290 which opens the file and transfers to block 292 which calls the process file subroutine of FIG. 9. After control is returned from the process file subroutine of FIG. 9, control returns to block 282 to process the next file until all files have been processed.

Figure 9:
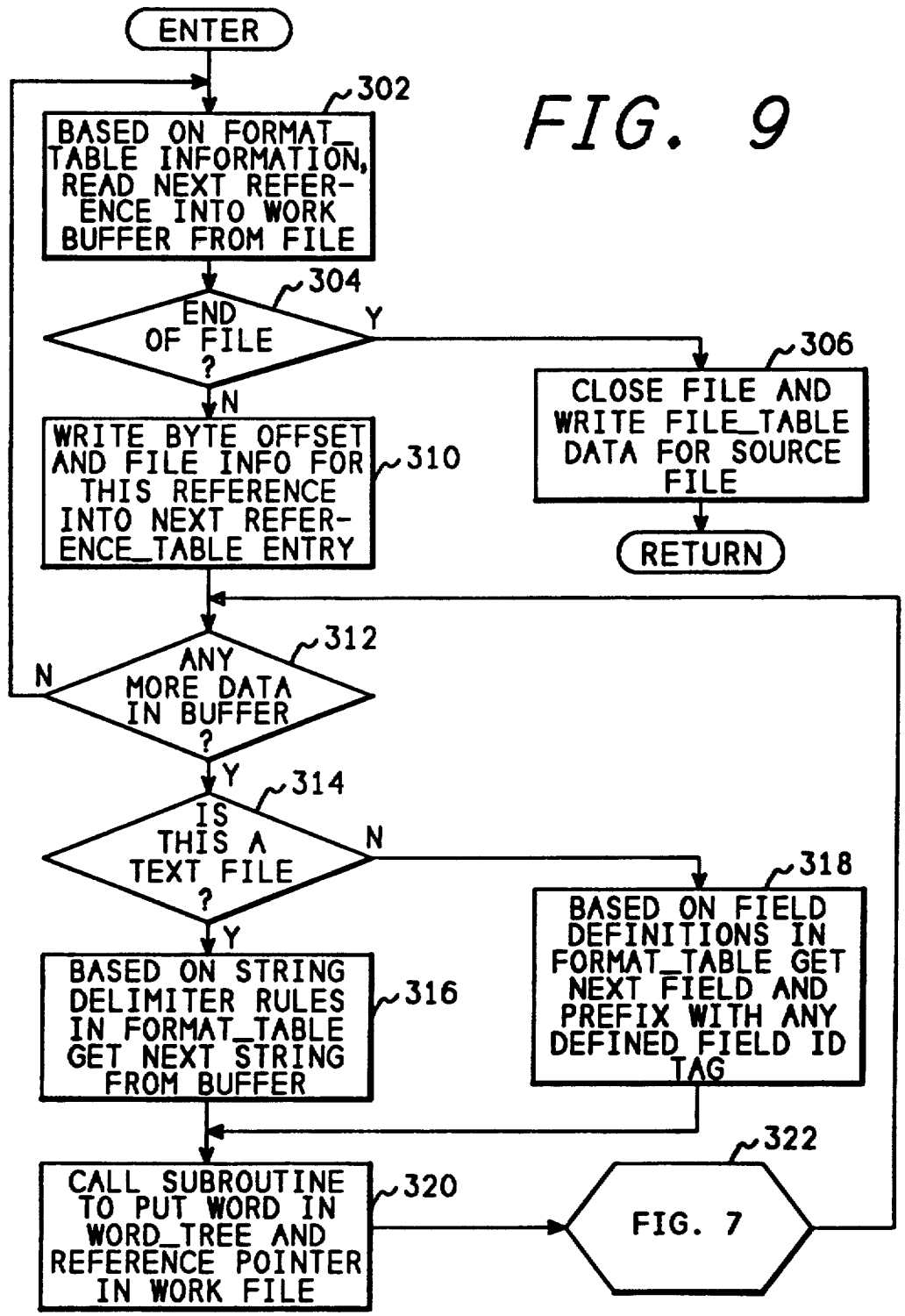
FIG. 9 is a flowchart showing the processing of each source file in phase 1 of the build search file process.

FIG. 9 is a flowchart showing the processing of a source data file. Block 302 receives control when the subroutine is called, and it reads the next reference page from the source data file into a work buffer. The size and contents of a reference page are determined by the format information for the file. A user may set the criteria that determines what constitutes a reference page for each file by defining a format name and associated parameters in the configuration file. Once defined, a format may be used for any number of files having the same structure. This is a powerful feature since it allows text oriented and record oriented files to be intermixed in the source data file list, and of course it also allows simultaneous searching of text and record oriented files. After reading the next reference page into the work buffer, block 304 checks for end of file. If end of file has not yet been encountered, block 310 creates a reference_table entry (FIG. 4) for this reference page. Block 312 checks for more data in the reference page, and if there is more data, control transfers to block 314. If the source data file being processed is a text file, control transfers to block 316 where words or strings are extracted from the reference page. If the source data file being processed is a record oriented file, the next field is extracted from the record by block 318. At this point, a unique field identifier can be attached to the field contents to indicate its origin. This identifier is optional and is specified in the configuration file. Once specified, the identifier becomes part of the field contents to be cataloged, and it enables the user to search only specified fields for search parameters by specifying the field's identifier. After extracting the next string or next field, block 320 transfers to block 322 to call the store string subroutine of FIG. 7, described earlier. After storing the string, control goes to block 312 until all strings or fields of the reference page have been processed, at which time block 312 transfers back to block 302 to get the next reference page. When all reference pages have been processed, block 304 transfers to block 306 to close the file and write a file_table entry for the file (FIG. 4) before returning control to the caller of the subroutine.

Figure 10:
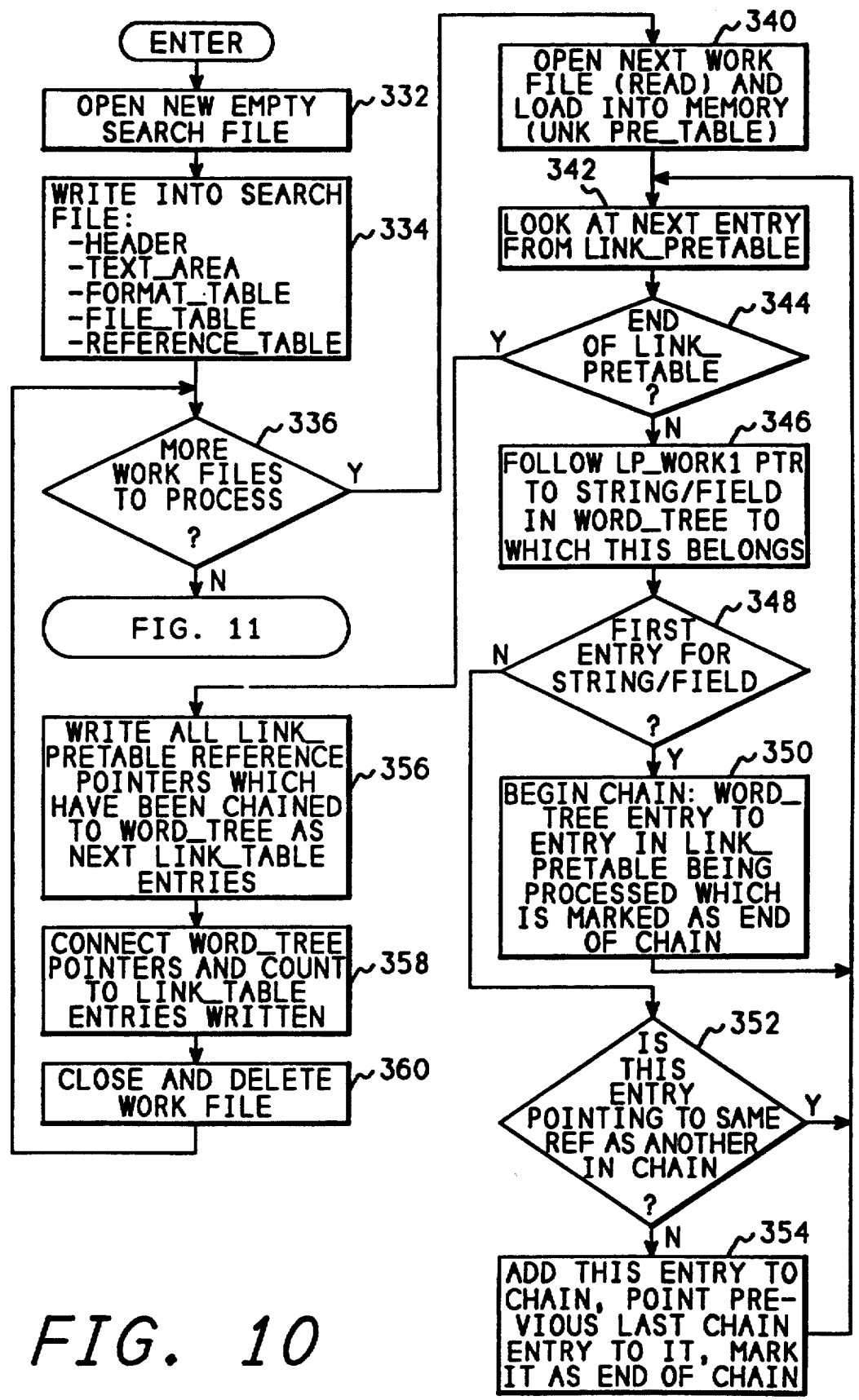
FIG. 10 is a flowchart depicting the work file processing of phase 2 of the build search file process.

After all source data files have been processed, block 284 of FIG. 8 transfers control to FIG. 10 to start phase two of the build process. Referring now to FIG. 10, block 332 opens the new search file, after deleting the old search file if it existed. At this time, block 334 writes to the search file all the information that has been completely built, including the file header which must be updated after the length of the link_table is determined, the text_area, format_table, file_table, and reference_table. Control is then transferred to block 336 which checks to see if all work files have been processed. If more work files need to be processed, block 340 opens the next work file and loads it into memory as the link_pretable. The format of the link_pretable is shown in FIG. 14, and this entry corresponds to the work file entry shown in FIG. 13, since the link_pretable is created from a work file. At this time, the entries in the link_pretable will be examined and chained to the appropriate word_tree entry. Block 342 examines the next entry from the link_pretable. If there are more link_pretable entries to be examined, block 344 transfers to block 346 to use the 1p_work1 pointer 422, which corresponds to the wf_word_pointer 414 of FIG. 13, to find the string or field to which this link_pretable entry belongs. Block 348 then checks to see if this is the first entry for this string/field and if it is the first entry, block 350 starts building a new chain from the word_tree entry by pointing the wp_work1 404 (FIG. 12) to this link_pretable entry as the beginning of the chain, and also by pointing wp_work2 406 (FIG. 12) to this link_pretable entry as the end of the chain. Block 350 then transfers to block 342 to get the next link_pretable entry. If this link_pretable entry is not the first entry, block 348 transfers to block 352 where the entry is checked to see if it points to the same reference page as another entry in the chain. If two entries in the same chain point to the same reference page, only one link_table entry needs to be created to allow the search process to find the string on the reference page, so this entry will not be linked into a chain and block 352 will transfer to block 342 to look at the next link_pretable entry. If the entry is not pointing to the same reference page as another in the chain, control transfers to block 354 where this entry is added to the end of the chain from the word_tree, and then control returns to block 342 to look at the next line_pretable entry. After all line_pretable entries have been examined, block 344 transfers to block 356 where all the link_pretable entries that have been chained to a word_tree entry are written to the search file as the next part of the link_table. Control then transfers to block 358 where wp_work1 (404 in FIG. 12) is written with the final index of the first entry in link_table which corresponds to the word and wp_work2 (406 in FIG. 12) is written with the count of link_table entries for the word. The word_tree entry is now complete for that word/string. Control then goes to block 360 which closes and deletes the work file. Control then transfers to block 336 where the loop continues until all work files have been processed. After all work files have been processed, control transfers to FIG. 11.

Figure 11:
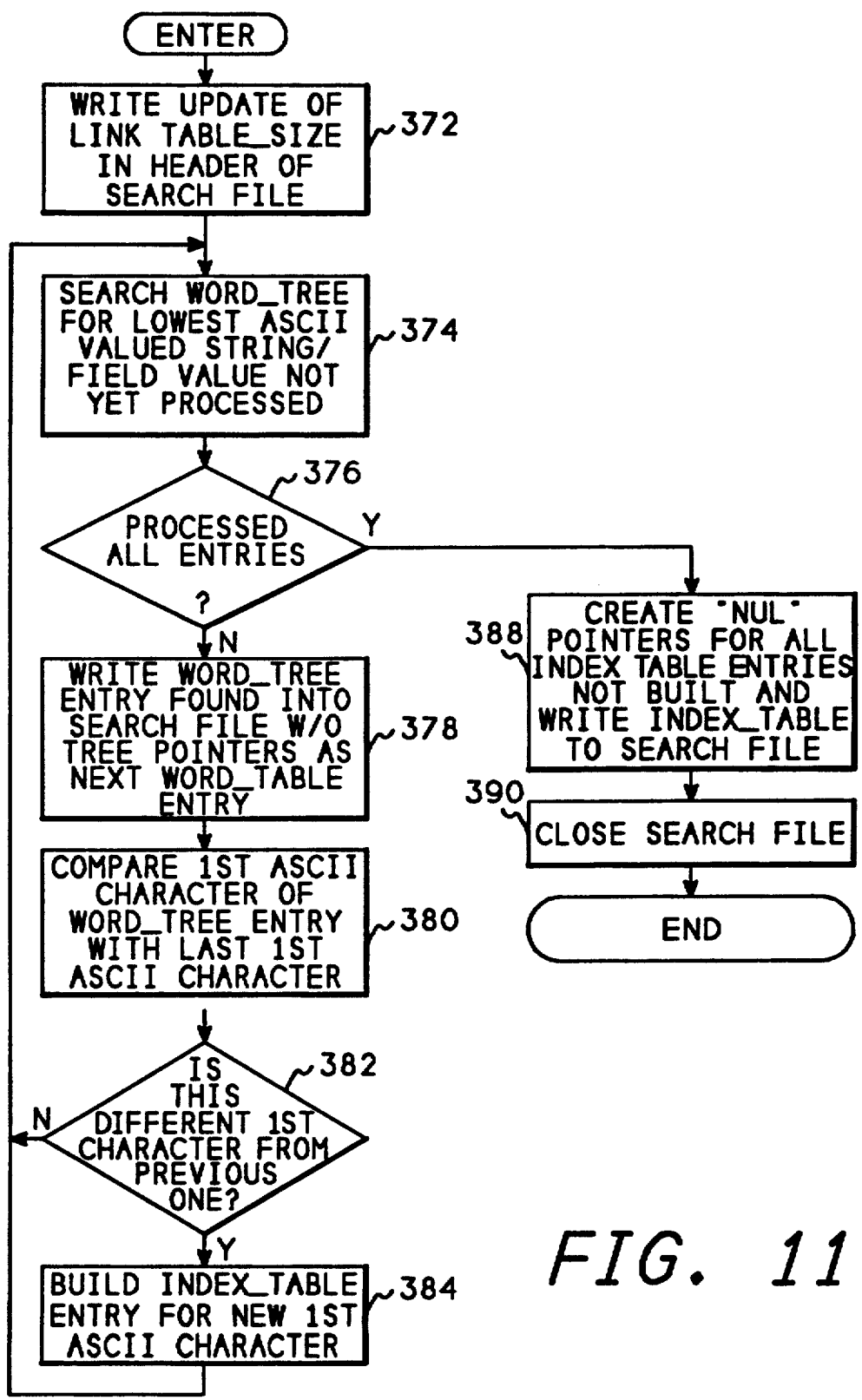
FIG. 11 is a flowchart depicting the creation of the search file during phase 2 of the build search file process.

FIG. 11 completes the build search file process. Block 372 receives control from FIG. 10 and it writes the updated search file header containing the new link_table size. Block 374 then searches the word_tree for the next string/field to be processed, starting at the lowest sort sequence value of its corresponding text string. If entries remain to be processed, block 376 transfers to block 378 to write this word_tree entry to the search file. Then block 380 checks the first part of the string/field to see if it should be added to the index entry and if it should be added, block 382 transfers to block 384 to build the index entry. Many different types of index mechanisms could be used to index into the word_tree. In the preferred embodiment, the first character of the string/field is used to build an index entry. After the index entry is built, or if no entry was necessary, control transfers back to block 374 to process the next word_tree entry until all entries have been processed, at which time block 376 transfers control to block 388 to complete the index. Then block 390 closes the search file to complete the build process.

Figure 15:
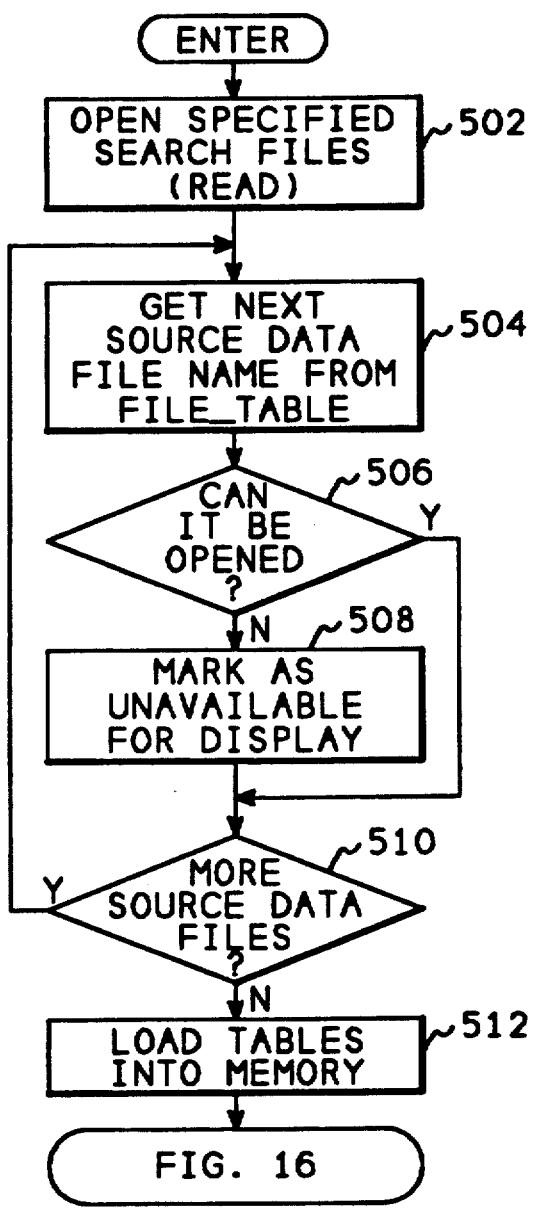
FIG. 15 is a flowchart depicting the initialization of the searching process.

FIGS. 15 through 18 are flowcharts showing the process of searching for terms using the search file and will be described in conjunction with FIG. 4 which shows the relationship of the tables contained in the search file. Referring now to FIG. 15, which shows the initialization of the search process, block 502 opens the search file and loads the file_table 62 (FIG. 4) from the search file specified by the user into memory. Block 504 then checks the next (or first) source data file to see if it is available to the user for displaying search results. The original source data files need not be available in order to get count and reference page information, but they must be available if the data on the reference page is to be displayed. If the source data file is not available block 506 transfers to block 508 where the file is marked as not available. In either case, control continues at block 510 where a check is made for additional source data files and if there are more, control returns to block 504. Otherwise, all source data files have been checked and block 512 loads some of the tables into memory for efficiency. The number of tables loaded depends on the memory available on the system being used. After loading the tables, control transfers to FIG. 16 to present the ready message to the user.

Figure 16:
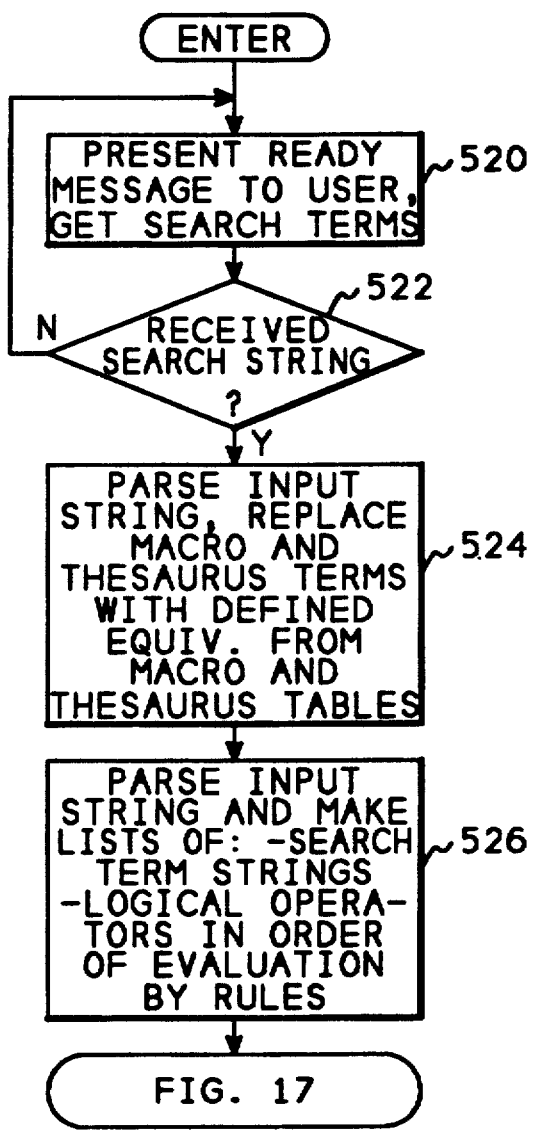
FIG. 16 is a flowchart showing the term search input of the searching process.

FIG. 16 is a flowchart depicting the presentation of the ready message and accepting search terms from the user. Block 520 displays the ready message on the user's terminal and block 522 loops until the user enters one or more search terms (strings). When the search terms have been entered, block 524 parses the strings, and replaces any macro or thesaurus terms with their equivalents from the macro or thesaurus tables. Block 526 then parses the input strings and makes lists of the search term strings and logical operators in the order of evaluation based on the precedence rules. Control then transfers to FIG. 17 to perform the search.

Figure 17:
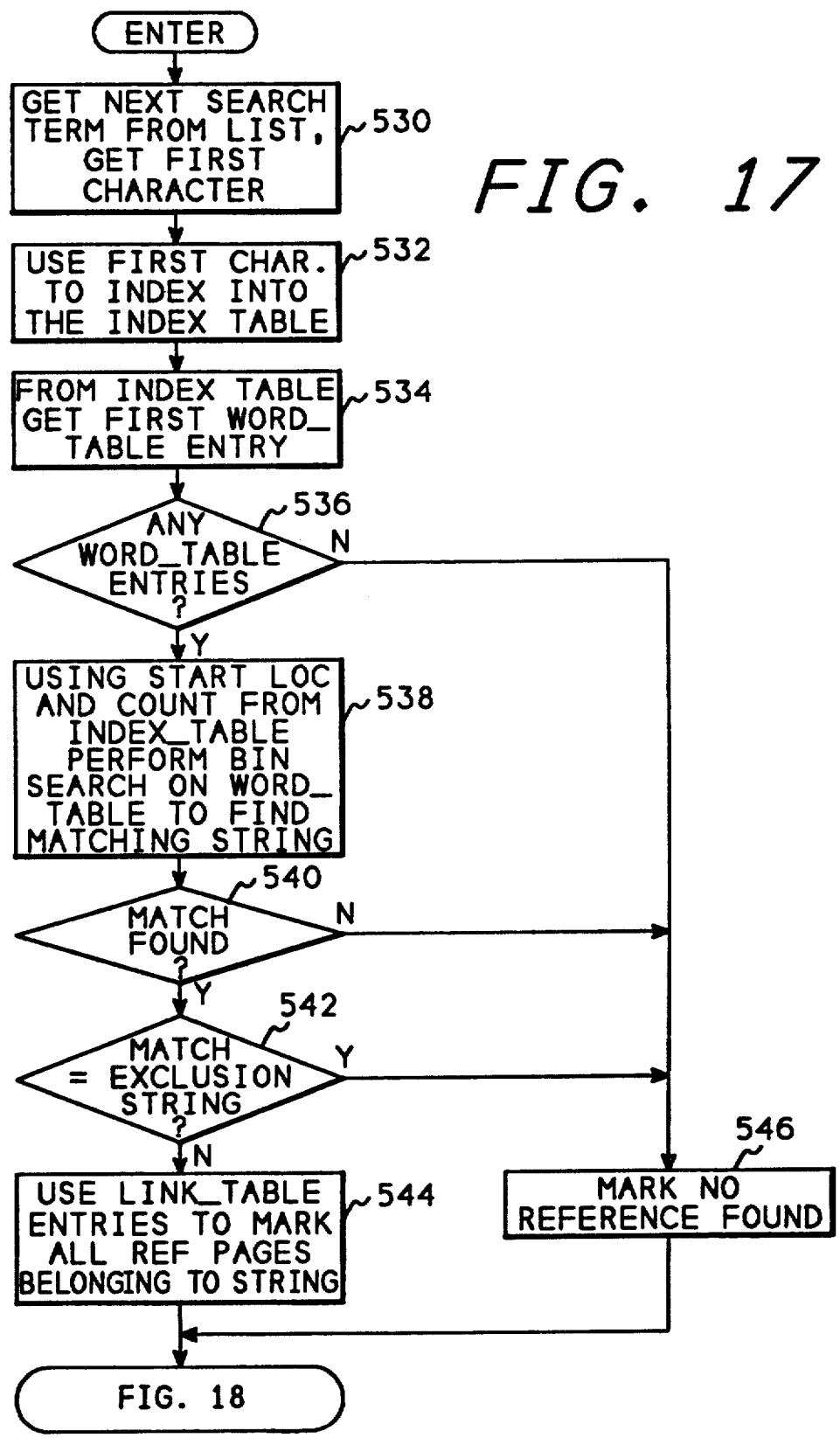
FIG. 17 is a flowchart depicting the search for a single term of the searching process.

FIG. 17 is a flowchart showing the search of a single term of the input search terms. Block 530 gets the next search term from the list made earlier and extracts the first character of the term. Block 532 uses the first character to access the index_table to get a pointer to the first word_table entry. Many indexing methods could be used to access the word_table. In the preferred embodiment of this invention, the first character of the unique strings is used to build an index into the word_table, however an index tree could be used instead, as well as indexing on a first part of each unique string. If no word_table entries are found, block 536 transfers control to block 546 to mark no reference pages found. Otherwise, control goes to block 538 where the index_table information is used to perform a binary search of the word_table of all entries starting with the same characters as the search term If no match is found, block 546 is used to mark no reference pages found, otherwise, block 542 checks to see if the term found is an exclusion word, and if so, block 546 is again used to mark no reference page found. If word_table entries are found for the first character, and if a match is found in those entries, and if the search term is not an exclusion word, block 544 uses the link_table entries pointed to by the word_table entry to mark all reference pages associated with the search string. Whether a match is found or not, control transfers to FIG. 18 to perform any other search term searches.

Figure 18:
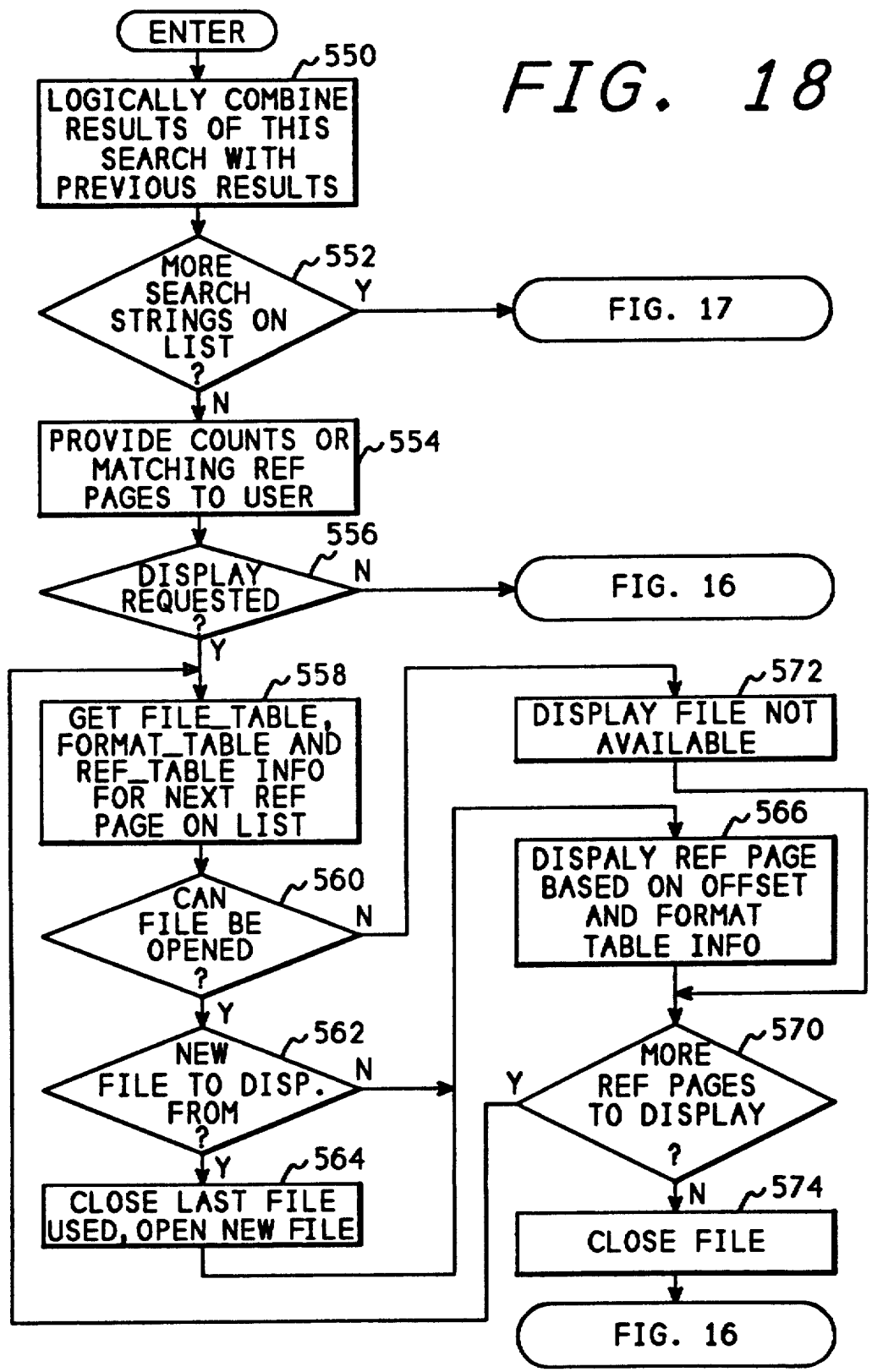
FIG. 18 is a flowchart depicting the combining of single term searches and displaying search results of the searching process.

FIG. 18 is a flowchart of the combining of results from multiple search terms, and the displaying of search results. Block 550 logically combines the results of the last search term with all previous search terms in this search. If there are more terms to search, block 552 transfers back to FIG. 17, otherwise, block 554 displays the count of reference pages found or the list of reference pages depending on the user request. If the user has not requested a display of the actual source data file pages, block 556 transfers to FIG. 16 to present the ready message for a new search. If a display of the original source data file_reference pages has been requested by the user, block 558 references the file_table, format_table and reference_table to determine the file, the type of file, and the reference page location in the file. If the file cannot be opened, block 560 transfers to block 572 to display a message indicating that the file is not available, otherwise block 562 determines if the display is to be from a file different from the one currently open. If the display is from a different file, block 564 closes the current file, and opens the new one. Then block 566 displays the data from the reference page. The present invention does not require that the source data files be opened one at a time, and in some implementations all these files may be opened initially and used as necessary.

This area of the figure shows that, in the preferred embodiment, because only one source data file is open at a time, the invention can easily be used in a network where access to the source data files would be on a different computer from the computer performing a search of the search file. In fact, if the user does not request a display of the original data, that is, the user is only interested in a count or a list of reference pages where the data was found, the network would not be accessed at all.

If there are more reference pages to be displayed, block 570 transfers back to block 558, otherwise, block 574 closes the file and returns to FIG. 16 to display the ready message and ask for a new search.

Figure 19:
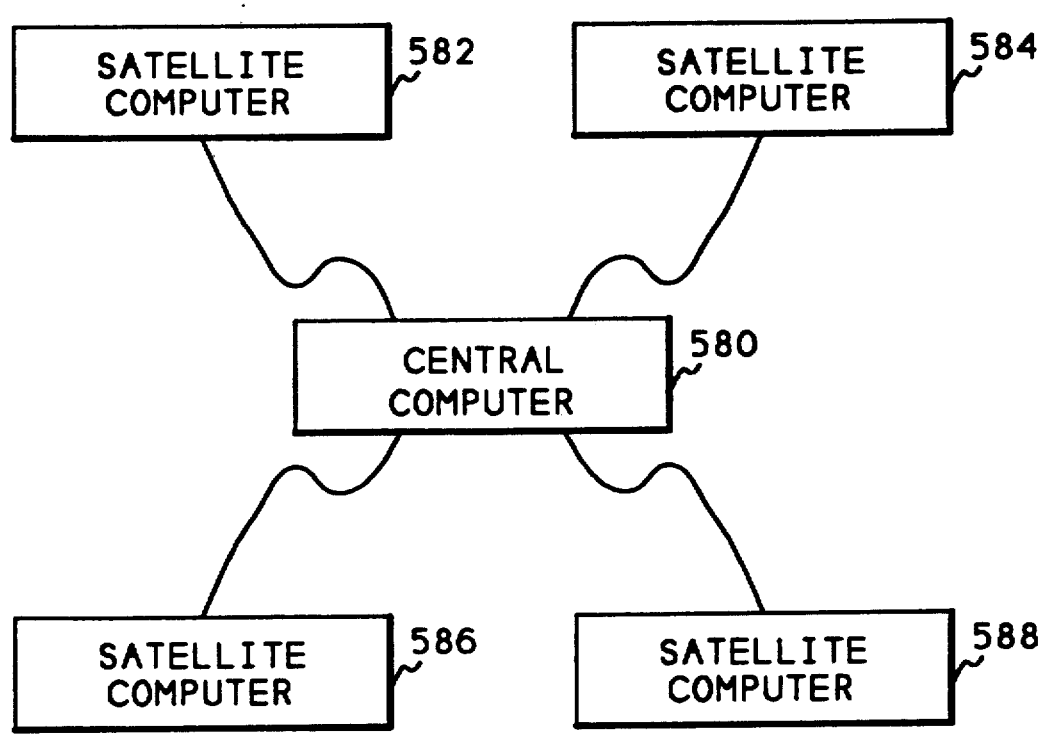
FIG. 19 shows a diagram of the search system distributed over a computer network.

FIG. 19 shows one way the system of the present invention may be used in a network. A central computer 580 could be used to contain the original source data files while satellite computers, such as those shown as 582, 584, 586, and 588 could contain copies of the search file. A user at any one of the satellite computers could perform a search using the search file on that computer, and the network would only need to be accessed when data from the original source data files was needed for display.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. A method of searching for and displaying information in a computer system, said computer system including storage means operable for storing therein information appearing in one or more text or record oriented data files to be searched, a processor means for performing all the steps of said method, input means coupled to said processor means for accepting search commands from a user of said method, and output means coupled to said processor means for displaying search results to said user, said method comprising the steps of:
   (a) reading from said storage means a file list of one or more data files to be searched;
   (b) retrieving and processing each of said data files in said file list;
   (c) identifying one or more reference pages in each of said data files;
   (d) building a search file comprising the steps of
      (d1) building a term table having a plurality of entries, one for each unique term in said data files,
      (d2) building a link table having a plurality of entries to connect entries in said term table to said reference pages, said link table having one link table entry for each coincidence of one of said term table entries and one of said reference pages that contains said unique term in said term table entry, and
      (d3) placing said term table and said link table in said search file;
   (e) accepting, from said input means, a search command having at least one search term;
   (f) searching said search file entries by comparing said at least one search term to said term table entries in said search file and creating a match table of all entries that match said search term;
   (g) displaying said match table and data from said data files on said output means.

2. The method of claim 1 wherein step (c) further comprises the steps of:
   (c1) reading a subdivision list file identifying at least one way of subdividing said data files; and
   (c2) subdividing said data files using all of said ways identified in said subdivision list file.

3. The method of claim 1 wherein said step (d1) further comprises the steps of:
   (d1a) extracting text characters contained in each entry of said term table for each said unique term;
   (d1b) constructing a text area having an entry corresponding to each said unique term for storing said characters contained in each said unique term; and
   (d1c) replacing said text characters in each said term table entry with a pointer to said corresponding text area entry whereby fixed length term table entries are created.

4. The method of claim 3 wherein step (d) further comprises the steps of:
   (d4) placing a count of link table entries for each unique term into said term table entry for said unique term; and
   (d5) placing a pointer to a first of said link table entries for each unique term into said term table entry for said unique term.

5. The method of claim 4 wherein step (f) further comprises the steps of:
   (f1) accessing said term table by comparing said search term with the contents of each term table entry until a matching entry is found;
   (f2) extracting said link table pointer from said matching entry;
   (f3) extracting said link table entries count from said matching entry;
   (f4) accessing one or more link table entries starting with said entry pointed to by said link table pointer and continuing for a number of entries defined by said link table entries count; and (f5) building a match table entry for each said link table entry extracted.

6. The method of claim 5 wherein steps (d) and (f) further comprise the steps of:
(d1a) organizing said term table entries into collating sequence; and
(f1a) accessing said term table by performing a binary search of said term table.

7. The method of claim 5 wherein steps (c) and (d2) further comprises the steps of:
(c1) organizing said reference pages in ascending order;
(d2a) organizing said link table entries for each said unique term as fixed length entries in contiguous areas of said link table; and
(d2b) organizing said link table entries for each unique term into a same order as an order of said reference pages.

8. The method of claim 7 wherein step (f4) further comprises the step of:
(f4a) accessing said link table by performing a binary search of said link table.

9. The method of claim 7 wherein step (f4) further comprises the step of:
(f4a) accessing said link table by performing a sequential search of said link table.

10. The method of claim 1 wherein step (d1) further comprises the step of identifying said terms as words, equations, or graphic symbols in text data files and identifying said terms as fields in record oriented files.

11. A method of searching for and displaying information in first and second computer systems, each of said computer systems including storage means, and a processor means for performing all the steps of said method, and wherein said second computer includes the input means coupled to said processor means for accepting search commands from a user of said method, and output means coupled to said processor means for displaying search results to said user, said method comprising the steps of:
(a) reading, with said first computer, from said storage means in said first computer a file list of one or more text or record oriented data files to be searched;
(b) retrieving and processing, with said first computer, each of said data files in said file list;
(c) identifying, with said first computer, one or more reference pages in each of said data files;
(d) building, with said first computer, a search file comprising the steps of
(d1) building a term table having a plurality of entries, one for each unique term in said data files, and
(d2) building a page table having a plurality of entries, one for each unique reference page in each of said data files,
(d3) building a link table having a plurality of entries to connect entries in said term table to entries in said page table, said link table having one link table entry for each coincidence of one of said term table entries and one of said reference pages that contains said unique term in said term table entry, and
(d4) placing said term table, said link table, and said page table in said search file;
(e) transferring said search file from said storage means in said first computer to said storage means in said second computer;

(f) accepting, from said input means in said second computer, a search command having at least one search term;
(g) searching, with said second computer, said search file entries by comparing said at least one search term to said term table entries in said search file and creating a match table of all entries that match said search term;
(h) retrieving from said first computer, data matching said occurrence list; and
(i) displaying, with said second computer, said match table and data retrieved from said first computer.

12. The method of claim 11 wherein step (c) further comprises the steps of:
(c1) reading, with said first computer, a subdivision list file identifying at least one way of subdividing said data files; and
(c2) subdividing, with said first computer, said data files using all of said ways identified in said subdivision list file.

13. The method of claim 11 wherein said step (d1) further comprises the steps of:
(d1a) extracting text characters contained in each entry of said term table for each said unique term;
(d1b) constructing a text area having an entry corresponding to each said unique term for storing said characters contained in each said unique term; and
(d1c) replacing said text characters in each said term table entry with a pointer to said corresponding text area entry whereby fixed length term table entries are created.

14. The method of claim 13 wherein step (d) further comprises the steps of:
(d5) placing a count of link table entries for each unique term into said term table entry for said unique term; and
(d6) placing a pointer to a first of said link table entries for each unique term into said term table entry for said unique term.

15. The method of claim 14 wherein step (g) further comprises the steps of:
(g1) accessing said term table by comparing said search term with the contents of term table entries until a matching entry is found;
(g2) extracting said link table pointer from said matching entry;
(g3) extracting said link table entries count from said matching entry;
(g4) accessing one or more link table entries starting with said entry pointed to by said link table pointer and continuing for a number of entries defined by said link table entries count; and
(g5) building a match table entry for each said link table entry extracted.

16. The method of claim 15 wherein steps (d) and (f) further comprise the steps of:
(d1a) organizing said term table entries into collating sequence; and
(g1a) accessing said term table by performing a binary search of said term table.

17. The method of claim 15 wherein steps (c) and (d3) further comprises the steps of:
(c1) organizing said reference pages in ascending order;
(d3a) organizing said link table entries for each said unique term as fixed length entries in contiguous areas of said link table; and (d3b) organizing said link table entries for each unique term into a same order as an order of said reference pages.

18. The method of claim 17 wherein step (g4) further comprises the step of:
(g4a) accessing said link table by performing a binary search of said link table.

19. The method of claim 17 wherein step (g4) further comprises the step of:
(g4a) accessing said link table by performing a sequential search of said link table.

20. The method of claim 11 wherein step (d1) further comprises the step of identifying said terms as words, equations, or graphic symbols in text data files and identifying said terms as fields in record oriented files.

21. A method of building a search file in a computer system, said computer system including storage means operable for storing therein information appearing in one or more text or record oriented data files to be searched and a processor means for performing all the steps of said method, said method comprising the steps of:
(a) reading from said storage means in a file list of one or more data files to be searched;
(b) reading from said storage means a predefined number of work files to be created;
(c) retrieving and processing each of said data files in said file list;
(d) identifying one or more reference pages in each of said data files;
(e) creating a binary tree containing a node for each unique term in said data files;
(f) placing each reference to identical terms within said reference pages in a predefined order within a predefined one of said predefined number of work files;
(g) extracting term information from said binary tree and building a term table having a plurality of entries in collating sequence, said term table including one entry for each unique term in said binary tree, each said one entry having a pointer to a corresponding set of entries in a link table, whereby said binary tree is replaced by said term table;
(h) extracting link information from said work files to build said link table, wherein said link table has a plurality of fixed length entries to connect entries in said term table to said reference pages, said link table including one link table entry for each coincidence of one of said term table entries and one of said reference pages that contains said unique term in said term table entry, wherein each said link table entry further includes a pointer to said one of said reference pages, whereby said work files are replaced by said link table; and
(i) placing said term table and said link table in said search file.

* * * * *